United States Patent
Katayama et al.

(10) Patent No.: US 6,856,277 B2
(45) Date of Patent: Feb. 15, 2005

(54) RADAR BEAM SCANNING METHOD, ON-VEHICLE RADAR APPARATUS AND RADAR SCANNING COMPUTER PROGRAM

(75) Inventors: Tetsuya Katayama, Aichi-ken (JP); Yuichi Tanaka, Seto (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/656,328

(22) Filed: Sep. 8, 2003

(65) Prior Publication Data

US 2004/0145513 A1 Jul. 29, 2004

(30) Foreign Application Priority Data

Sep. 9, 2002 (JP) ........................................ 2002-262917

(51) Int. Cl.$^7$ ............................................. G01S 13/93
(52) U.S. Cl. ........................... 342/70; 342/74; 342/75; 342/107; 342/157; 342/158
(58) Field of Search ............................... 342/70–72, 74, 342/75, 81–83, 85, 107, 113–115, 123, 139, 140, 146–148, 157, 158; 340/435, 436, 903; 701/301

(56) References Cited

U.S. PATENT DOCUMENTS

| | | | | | |
|---|---|---|---|---|---|
| 3,680,085 | A | * | 7/1972 | Del Signore | ................ 342/128 |
| 5,515,059 | A | * | 5/1996 | How et al. | ................ 342/372 |
| 6,073,078 | A | * | 6/2000 | Kitahara et al. | ............ 701/300 |
| 6,337,656 | B1 | * | 1/2002 | Natsume et al. | ............ 342/149 |
| 6,429,804 | B1 | * | 8/2002 | Kishida et al. | ............... 342/70 |
| 6,577,269 | B2 | * | 6/2003 | Woodington et al. | ....... 342/196 |
| 2002/0005778 | A1 | * | 1/2002 | Breed et al. | ................ 340/435 |
| 2003/0189511 | A1 | * | 10/2003 | Lasky et al. | .................. 342/22 |

FOREIGN PATENT DOCUMENTS

| | | |
|---|---|---|
| JP | 4-276582 | 10/1992 |
| JP | 10-142324 | 5/1998 |
| JP | 11-27036 | 1/1999 |
| JP | 11-271441 | 10/1999 |
| JP | 3186366 | 5/2001 |

OTHER PUBLICATIONS

"System and parametric tradeoffs of forward looking automotive radar systems", Nagy, W.; Wilhelm, J.;Radar Conference, 1996., Proceedings of the 1996 IEEE National , May 13–16, 1996 Ps: 19–26.*

"Fully–MMIC 76 GHz radar for ACC", Kuroda, H.; Nakamura, M.; Takano, K.; Kondoh, H.;Intelligent Transportation Systems, 2000. Proceedings. 2000 IEEE, Oct. 1–3, 2000 Ps:299–304.*

"Radar System" by R. Fukui et al.; Foundations and Applications of Millimeter Wave Technologies; pp., 232–235 (w/partial English translation).

* cited by examiner

*Primary Examiner*—John B. Sotomayor
(74) *Attorney, Agent, or Firm*—Posz & Bethards, PLC

(57) ABSTRACT

In the on-vehicle radar apparatus of the present invention, the vertical scanning width of the radar beam is narrowed, before the horizontal scanning, thereby avoiding unnecessary data processing and improving the data processing efficiently. Further, the S/N ratio of the target detection signal is increased, thereby stabilizing the distance detection and its accuracy. The vertical scanning antenna is a single travelling wave excitation antenna (TWEA) constructed by a plurality of antenna elements. At the same time, the horizontal scanning antenna is a multi-channel antenna wherein a plurality of TWEAs is assigned to a plurality of horizontal directions. The horizontal scanning angle is arbitrarily widened by increasing the number of TWEAs.

15 Claims, 15 Drawing Sheets

18 TRANSMISSION ANTENNA
20 RECEPTION ANTENNA d (INTER-ELEMENT DISTANCE) IN A.U.

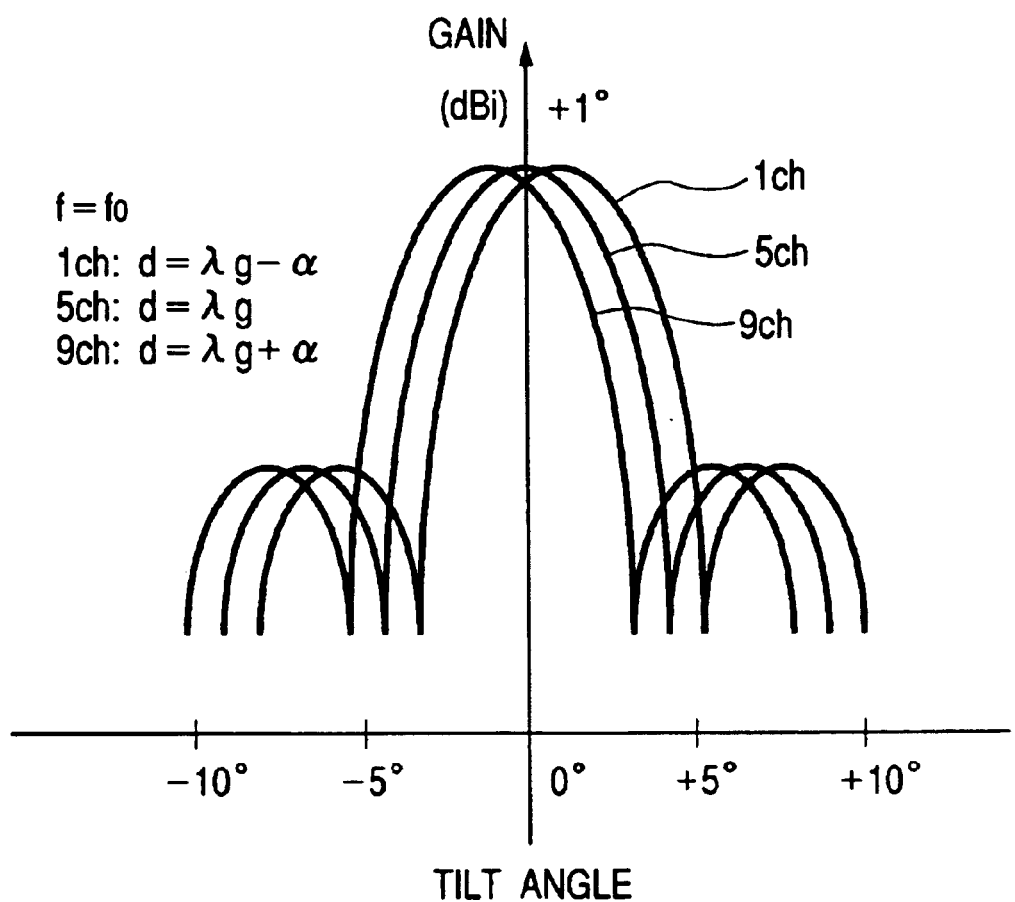

RADAR BEAM SCANNING METHOD, ON-VEHICLE RADAR APPARATUS AND RADAR SCANNING COMPUTER PROGRAM

BACKGROUND OF THE INVENTION

1. Field of the Invention

The present invention relates to a radar beam scanning method, on-vehicle radar apparatus and radar scanning computer program, for detecting a target object which reflects an electromagnetic waves radiated from the frequency-modulated continuous wave (FMCW) radar apparatus mounted on a automotive vehicle.

2. Description of the Related Art

On-vehicle radar apparatuses for detecting a distance, relative speed and direction of such a target around the vehicle as an obstacle or precedent vehicle have been widely employed in order to control a crash prevention and tracking travelling.

The radar apparatus of this kind is fixed at the vehicle front in such a manner that the electromagnetic wave beam for detecting the target is parallel to the road surface. Further, the radar beam is preferably collimated along the vertical direction, thereby suppressing a reflection from the road surface.

However, when the radar beam is over-collimated, the radar beam is apt to miss the target due to a vertical inclination during an acceleration & deceleration and during carrying a heavy load. Thus, the conventional on-vehicle radar have a disadvantage that the target is missed or the reflection from the target is decreased, thereby remarkably lowering a detectable distance and detection accuracy.

The detectable distance and detection accuracy are further lowered by a vertical inclination of a radar antenna due to an installation accuracy and change with the passage of time.

The disadvantage of the conventional on-vehicle radar may be overcome, as disclosed in JP4-276582A, 1992, by controlling the tilt angle of the antenna on a rotating stage in such a manner that the tilt angle is made parallel to the road surface on the basis of the road surface reflection or on the basis of the vertical inclination due to the acceleration utilizing a detected acceleration and conversion table stored beforehand of acceleration and tilt angle.

Further, it is disclosed in JP No. 3186366 that the tilt angle is adjusted by a screw in such a manner that a beam intensity reflected from the target is displayed in order to maximize the reflected intensity during the adjustment by the screw.

However, JP4-276582A has a disadvantage that the tilt angle can not always be rotated to a prescribed angle, because the road surface reflection depend upon the road surface state, ground topology and distance between the vehicle and the road surface from which the radar beam is reflected.

Further, when the tilt angle is to be controlled on the basis of the conversion table of acceleration and tilt angle, the tilt angle can not always be rotated to a prescribed angle, due to an incorrect recognition of the horizontal reference direction, or due to a shift along the vertical direction (caused by an unexpected factor other than the acceleration) of the relative position between the target and antenna.

Furthermore, JP No. 3186366 has a disadvantage that the tilt angle can not be adjusted in response to the directional change during the vehicle's travelling, although it can be easily adjusted during the installation and maintenance of the antenna.

SUMMARY OF THE INVENTION

An object of the present invention is to easily and precisely detect such a target as an obstacle or proceeding vehicle, even when the target is relatively shifted to an on-vehicle radar along a direction perpendicular to a radar beam scanning direction.

The radar beam scanning method of the present invention is a method for scanning a radar beam for tracing a moving target. A second (vertical) direction of the moving target is first detected by a second direction scanning (vertical scanning) of the radar beam. Then, under the detected angle of the moving target, the radar beam is scanned along a first direction (horizontally), thereby tracking the moving target and obtaining two-dimensional information of the moving target.

The on-vehicle radar apparatus of the present invention is an apparatus for executing the above mentioned radar scanning method.

Further, the computer program of the present invention is a computer program for executing the above mentioned radar scanning method and for operating the above mentioned on-vehicle radar. The radar scanning operation is described by a computer language and read into a CPU or stored in such a memory medium as an optical disc, or hard disc and the like.

According to the method of the present invention, apparatus and computer program of the present invention, a tilt angle along the second direction of the radar beam is decided by following a great change of the angle where the target exists, thereby efficiently receiving the reflected radar beam during the first direction scanning (horizontal reception scanning). As a result, S/N ratio of the target detection signal is increased, thereby stabilizing the distance detection and its accuracy.

Further, a width of the second direction scanning (vertical transmission scanning) is narrowed, before the horizontal reception scanning, thereby avoiding unnecessary data processing and improving the data processing efficiency.

Further, the S/N ratio of the target detection signal is increased, thereby stabilizing the distance detection and its accuracy.

Here, the tilt angle is decided on the basis of a peak or pattern of the intensity distribution of the radar beam reflected by the target.

Typically, the on-vehicle radar apparatus of the present invention includes a transmission antenna for the vertical transmission scanning and a reception antenna for the horizontal reception scanning. The transmission antenna may be a travelling wave excitation antenna (TWEA) and the reception antenna may be a plurality of TWEAs. Here, the TWEA is constructed by a plurality of antenna elements each of which is arranged along the second (vertical) direction and are fed sequentially by a feeding line along the second direction.

However, the transmission and/or reception antenna may include a plurality of unit antennas e.g., TWEAs. Further, the transmission and/or reception antenna may be a single antenna e.g., a single TWEAs. Further, the antenna may be commonly used for the transmission and reception.

The tilt angle (angle between a direction perpendicular to an antenna surface) and peak direction of the transmitted or received radar beam is changed by the frequency of the radar wave.

Here, the TWEA is fed from the upper side of the antenna substrate. The tilt angle $\theta$ is zero degree, when the wavelength "λg" in the antenna substrate corresponding a frequency is equal to the distance between the antenna elements (inter-element distance: IED), because the signal phase is the same at every antenna element. On the other hand, θ is positive (directed upward from the antenna surface), when IED is smaller than λg, because the signal phase becomes advanced as the antenna element becomes distant far from the feeding point. Further, θ is negative (directed downward from the antenna surface), when IED is greater than λg, because the signal phase becomes delayed as the antenna element becomes distant far from the feeding point. The absolute value of θ becomes great as the absolute value of (IED-λg) becomes great, where the absolute value of (IED-λg) is smaller than λg/2.

According to the TWEA, the tilt angle is instantly changed merely by changing the frequency. Thus, any mechanical parts is not required for the radar beam scanning, thereby manufacturing a compact and cheap scanning apparatus and improving its reliability.

The tilt angle of the horizontal reception antenna may be changed not by changing the frequency but by selecting one or more TWEAs among the plurality of TWEAs of which tilt angles are different with each other. A number ot TWEAs may be increased, because a controllable range of the tilt angle is limited due to an antenna gain which is greatly decreased as the frequency is out of a prescribed range.

In the horizontal reception antenna, the tilt angle differences between the TWEAs and number of the TWEAs are decided in such a manner that an accuracy of detecting the horizontal direction of the target is within a prescribed tolerance. This is because the detection accuracy becomes decreased as the tilt angle differences are made great.

The tilt angle of each TWEAs may be changed by changing IED under a constant frequency excitation, although it may be changed by changing the antenna surface for each TWEA.

As explained above, the tilt angle θ is zero degree, when λg is equal to IED, θ is positive, when IED is smaller than λg and θ is negative, when IED is greater than λg.

The tilt angle may be shifted, by a mechanical inclination of the antenna surface, by a mechanical inclination of a prism opposite to the antenna surface, or by changing the radio wave frequency, if the number of TWEAs are not sufficient, e.g., due to a n installation space.

The horizontal scan antenna may be also utilized for the vertical scan by selecting a TWEA, thereby manufacturing a compact sized on-vehicle radar apparatus.

The on-vehicle radar apparatus of the present invention has further Features.

A Feature is that the tilt angle may be set up for a most distant moving target in order to surely capture it. The near target is easily captured due to great reception sensitivity, even when the vertical direction is more or less shifted.

Another Feature is that the relative speeds between said on-vehicle radar apparatus and moving & not-moving targets are detected, whereby the tilt angle is set up only for one of the moving target. Thus, it is prevented that the radar apparatus sets up a tilt angle for an unnecessary object. As a result, the detection accuracy for a necessary target is improved.

Still another Feature is that a size such as a height or projected area of the moving target is estimated, whereby the impact can be estimated if the on-vehicle radar apparatus crashed against the preceding target. The crash impact estimation is applied for controlling a crash safety apparatus such as an air bag.

BRIEF EXPLANATION OF THE DRAWINGS

FIG. 8 is a graph of the gain for the oscillation frequency of the travelling wave excitation antenna as shown in FIG. 7A vs. radar beam radiation angle (tilt angle).

PREFERRED EMBODIMENT OF THE INVENTION

Figure 1:
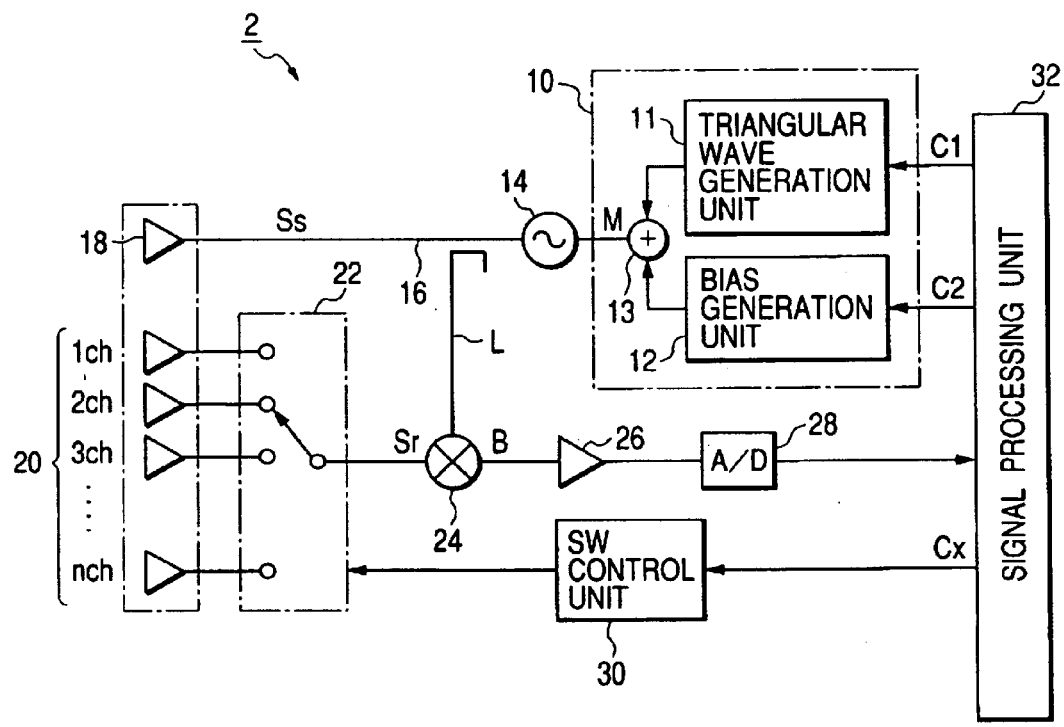
FIG. 1 is a block diagram of the radar apparatus of Embodiment 1 of the present invention.

Preferred embodiments are explained, referring to the drawings.

Embodiment 1

The radar apparatus 2 of Embodiment as shown in FIG. 1 comprises: a modulation signal generation unit 10 for generation a modulation signal "M" in accordance with modulation instructions C1 and C2; a VCO 14 for varying an oscillation frequency in accordance with "M"; a distributor 16 for distributing an output from the VCO 14 into a transmission signal Ss and local signal "L"; a transmission antenna 18 for radiating an electromagnetic wave in accordance with the Ss; a reception antenna 20 including "n" unit antennas for receiving the reflected electromagnetic wave; a reception switch 22 for selecting one of the "n" unit antennas for receiving a reception signal Sr; a mixer 24 connected with the switch 22 for mixing Sr and "L" in order to generate a beat signal "B"; an amplifier 26 for amplifying "B"; an A/D converter 28 for converting the amplified "B" into a digital data; a SW control unit 30 for controlling the reception switch 22 in accordance with a mode designation instruction Cx; and a signal processing unit 32 for generating C1, C2 and Cx and for processing the digital signal "B" from the A/D converter 28 in order to obtain information of the target.

Figure 2A:
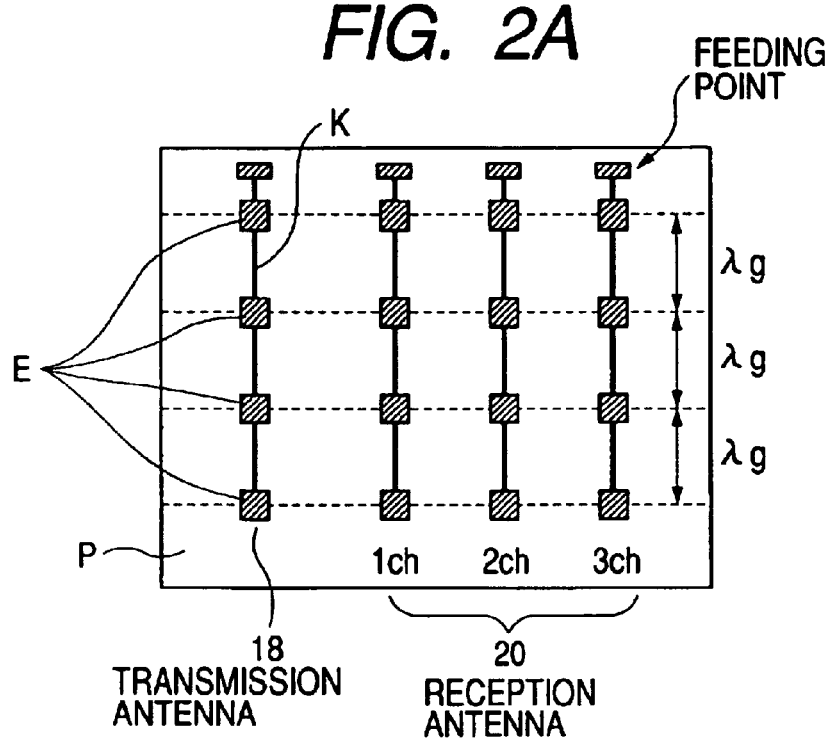
FIG. 2A is a conceptual planar view of the transmission antenna and reception antenna formed on a substrate for Embodiment 1.

As shown in FIG. 2A, the transmission antenna 18 and reception antenna 20 are formed on a substrate "P" in such a manner that each antenna is a travelling wave excitation antenna wherein a plurality of antenna elements "E" are arranged at regular intervals λg and are connected with each other with a feeder "K". One to "n" channels are assigned to the "n" unit antennas of the reception antenna 20, although only three channels are shown in FIG. 2A.

Hereinafter, each travelling wave excitation antenna for the transmission antenna 18 and reception antenna 20 is called a unit antenna.

The unit antenna extends along the vertical direction and is fed at the upper position of the substrate "P". Further, the interval between the antenna elements "E" is λg, where λg is a wavelength in the substrate "P" of a reference frequency $f_0$, e.g., 76.5 MHz of the electromagnetic wave of the radar beam of the radar apparatus 2.

Figure 2B:
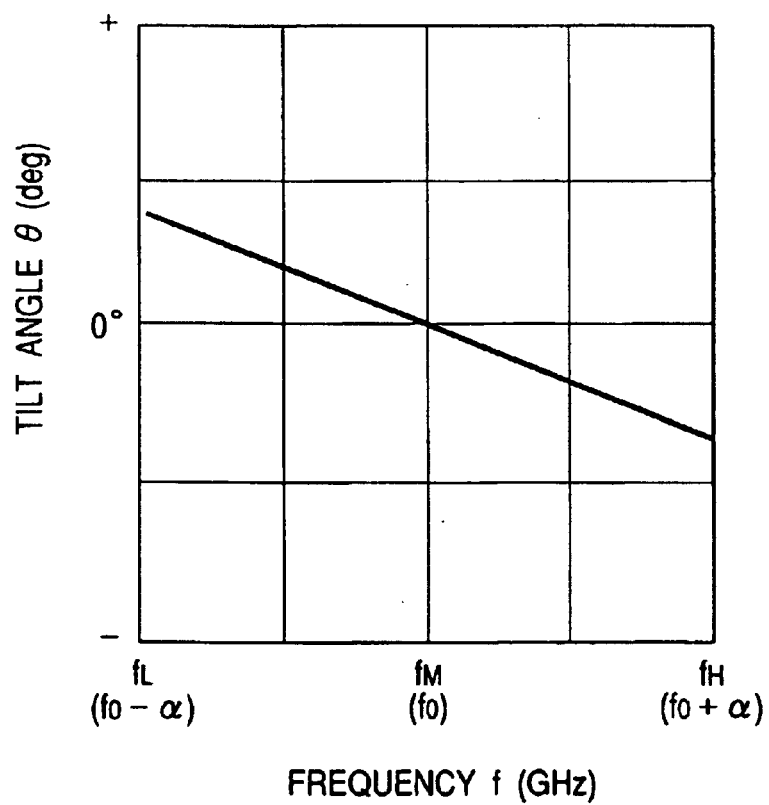
FIG. 2B is a graph of the oscillation frequency of the travelling wave excitation antennas in the reception antenna as shown in FIG. 2A vs. radar beam radiation angle (tilt angle).

The tilt angle θ is also a radiation direction of the unit antenna. Concretely, θ is made zero as shown in FIG. 2B, when the radiation is of wavelength is λg and frequency $f_0$. Further, θ is positive and the radar beam radiation is directed to the upward, when the radiation frequency is greater than $f_0$. On the other hand, θ is negative and the radar beam radiation is directed to the downward, when the radiation frequency is smaller than $f_0$. Here, |λg-λ| is assumed to be smaller than λg/2. The tilt angle |θ| increases, as |λg-λ| increases.

Figure 2C:
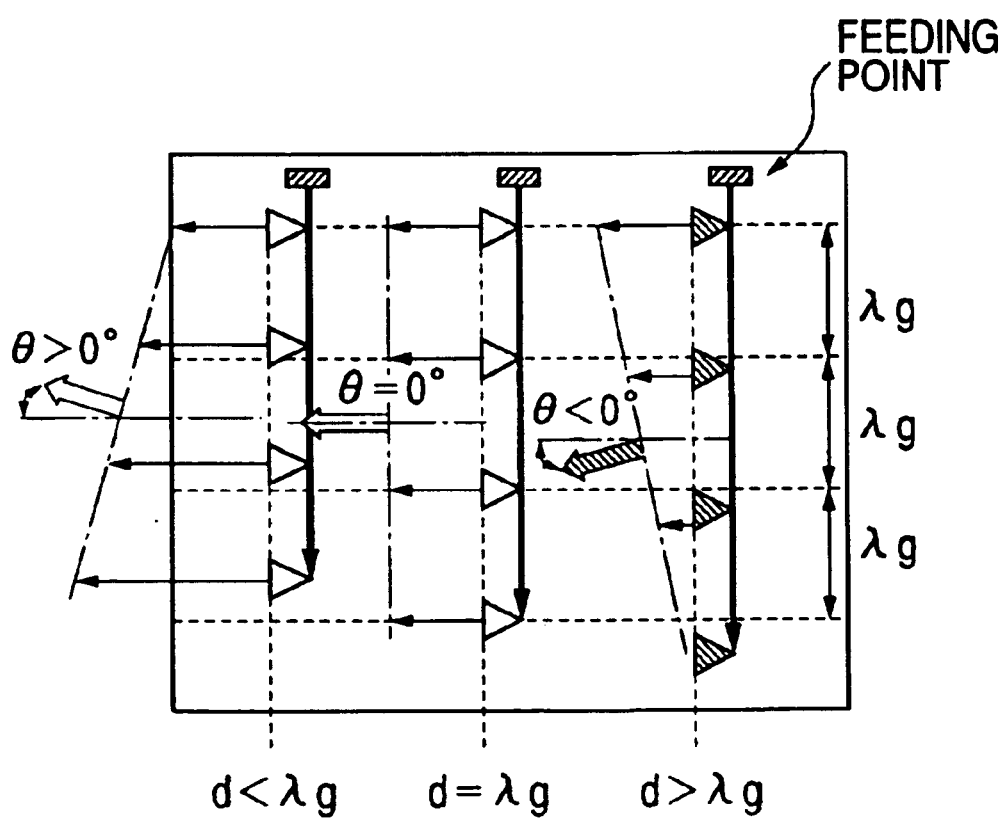
FIG. 2C is an illustration showing the relationship between the tilt angle (radiation angle of radar electromagnetic wave) and the distance between the antenna elements.

As shown in FIG. 2C, The tilt angle θ is also expressed in terms of the inter-element distance "d" (distance between the antenna elements). If "d" is equal to λg, then, θ=zero. If "d" is smaller than θg, then, θ is positive, while if "d" is grater than λg, then, θ is negative.

The modulation signal generation unit 10 comprises: a triangular wave signal generation unit 11 (started and stopped by the modulation instruction C1) for generating at its start an AC triangular wave; a bias generation unit 12 for generating a DC bias signal of which level is designated by the modulation instruction C2; and an adder for generating the modulation signal "M" by adding the output from the triangular wave generation unit 11 to the output from the bias generation unit 12.

The modulation signal "M" is the DC bias signal during stopping the triangular wave generation unit 11 in accordance with C1, while it is a biased AC triangular wave during starting and activating the triangular wave generation unit 11 in accordance with C1.

Figure 3:
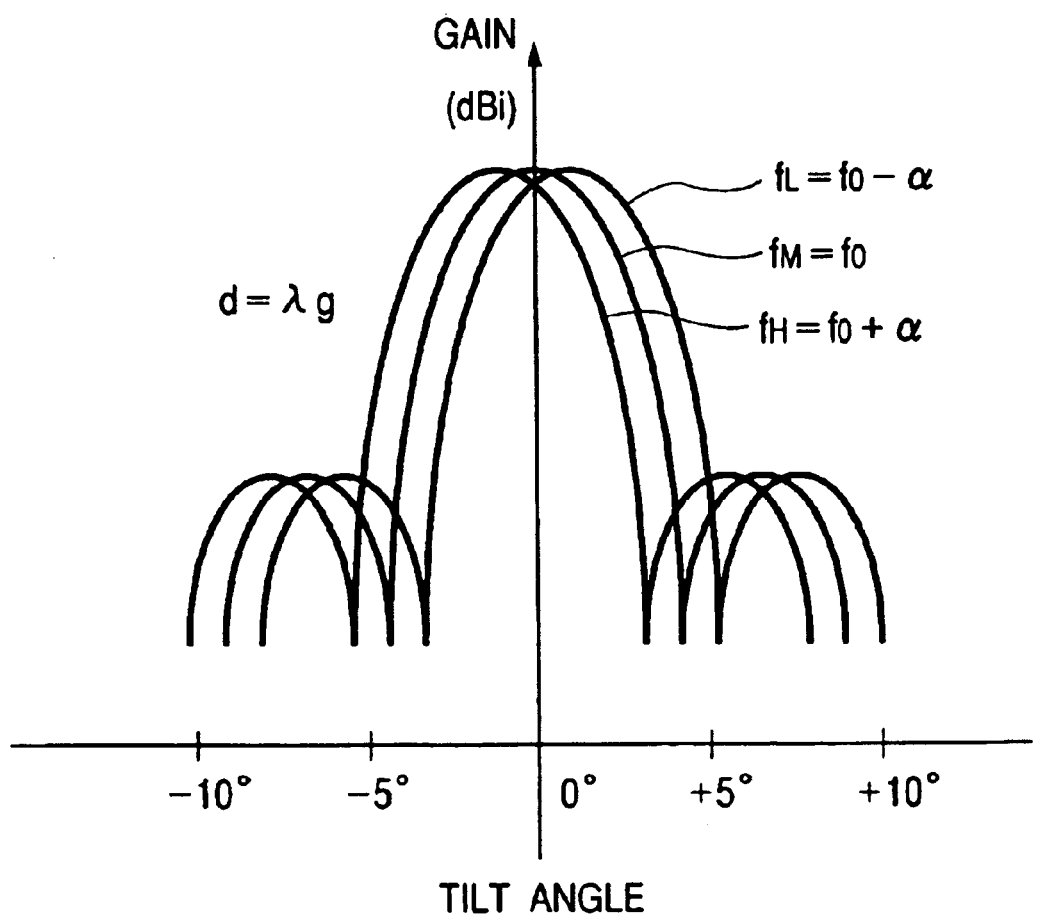
FIG. 3 is a graph of the gain for the oscillation frequency of the travelling wave excitation antenna as shown in FIG. 2A vs. radar beam radiation angle (tilt angle).

The amplitude of the triangular wave generated by the triangular generation unit 11 is such that the oscillation frequency of the VCO 14 is changed by ΔF, while the levels of the bias signal generated by the bias generation unit 12 are threefold whereby the oscillation frequency of the VCO 14 is changed to $f_L(=f_0-\alpha)$, $f_M(=f_0)$ or $f_H(=f_0+\alpha)$ Thus, the modulation signal generation unit 10 generates a pulse wave of a single frequency during stopping the triangular wave generation unit 11, while it generates a frequency-modulated continuous wave (FMCW) of which central frequency is switched to either of $f_L$, $f_M$, or $f_H$, thereby changing the radar beam tilt angle θ in three steps, as shown in FIG. 3.

Here, it is preferable that a gives a sufficient gain for the unit antenna (travelling wave excitation antenna) and that ΔF is sufficiently smaller than α. For example, ΔF may be about α/5.

The SW control unit 30 selects only one prescribed channel, e.g., 1 ch by the reception switch 22, when a vertical scan mode is designated by the mode designation instruction Cx. On the other hand, it sequentially selects every channel (1 ch to "n" ch) by the reception switch 22., when a horizontal scan mode is designated.

The signal processing unit 32 is a well-known microcomputer including CPU, ROM, RAM and digital signal processing (DSP) unit for executing the fast Fourier transform (FFT) of the data from the A/D converter 28.

The radar apparatus 2 as shown in FIG. 1 generates the transmission signal Ss and local signal "L" by distributing the output from the VCO 14 operating in accordance with the modulation signal "M". Thus, Ss is transmitted from the transmission antenna 18.

Then, the radar beam carrying Ss is reflected by the target, is received by the "n" unit antennas of the reception antenna 20. Then, the reception signal Sr from the unit antenna(s) selected by the reception switch 22 is inputted into the mixer 24 which generates the beat signal "B" by mixing Sr and the local signal "L" from the distributer 16. Further, the beat signal "B" is amplified and is inputted into the signal processing unit 32. The data inputted into the signal processing unit is a single channel (prescribed channel, e.g., 1 ch) data under the vertical scan mode, while data every channel is sequentially inputted into the signal processing unit 32.

Figure 4:
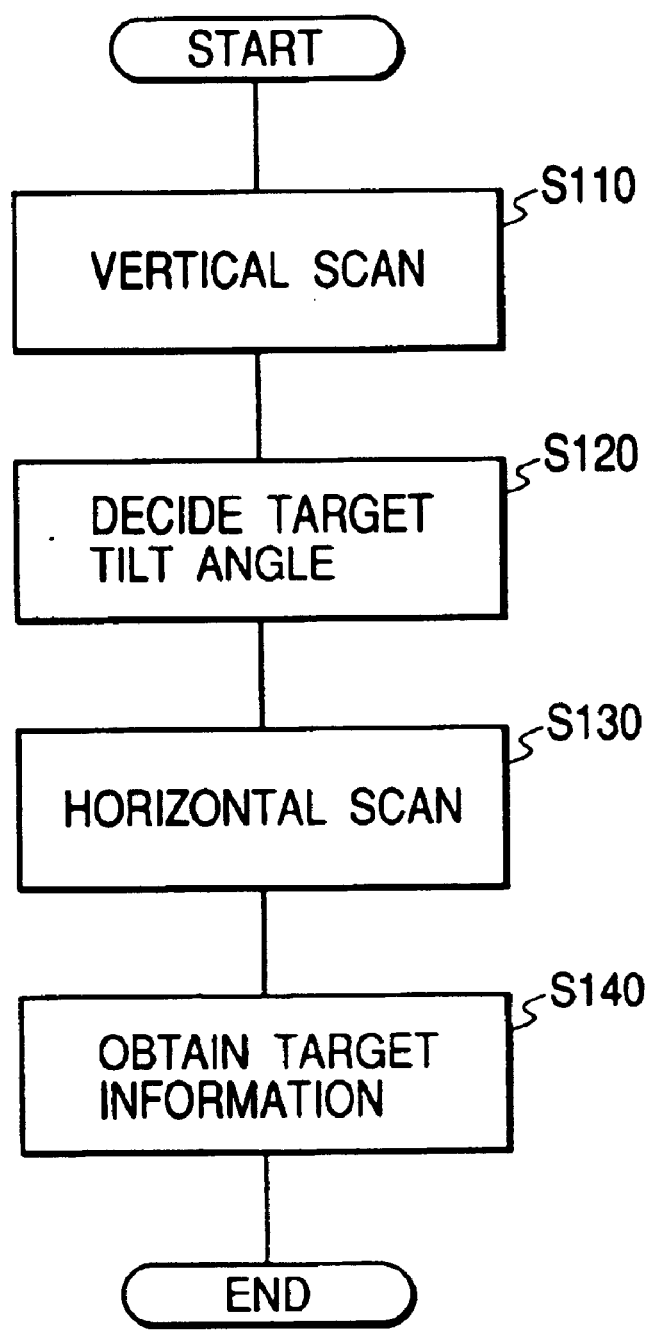
FIG. 4 is a flow chart of the data processing executed at a prescribed time interval by the signal processing unit.

FIG. 4 is a flow chart for the data processing executed at a prescribed time interval by the signal processing unit 32.

First, at S110, the vertical scan is executed in order to measure the reflected intensities at three tilt angles θ.

Concretely, the mode designation instruction Cx is switched to the vertical scan mode, thereby stopping the triangular wave generation unit 11, and the frequency is sequentially switched to $f_L$, $f_M$ and $f_H$, thereby changing the tilt angle θ. Thus, the sampling data of the reflected intensity every tilt angle θ is stored.

Next, at S120, the target tilt angle (radar beam radiation angle or radar beam tilt angle to be directed to the target) is calculated on the basis of a reflected intensity distribution constructed by the stored sampling data.

The target tilt angle may be a peak where the reflected intensity becomes maximum. Alternatively, the target tilt angle may be decided by the distribution pattern. Further, it may be a centroid of three peaks corresponding to the three vertically scanned angles θ. Furthermore, it may be decided by the pattern matching method on the basis of previously stored reflection patterns of kinds of target vehicles and distances to the targets.

Next, at S130, the horizontal scan is executed at the decided target tilt angle θ in order to obtain the beat signal "B".

Concretely, the mode designation instruction Cx is switched to the horizontal scan mode, thereby setting up in accordance with the modulation instruction the central frequency of the radar wave to be the target tilt angle θ decided at S120 and starting in accordance with the modulation instruction C1 the triangular wave generation unit 11. Thus, the sampling data every channel 1 ch to "n" ch is stored.

Next, at S140, the target information is obtained on the basis of the sampling data stored at S130, thereby ending the data processing.

The target information is calculated on the basis of the amplitudes and phases of the sampling data. The target information includes at least the distance to the target, relative speed between the target and on-vehicle radar and horizontal direction of the target. The calculation method is not explained, because it is well known in the technical field of frequency-modulated continuous wave (FMCW) radar.

Figure 5:
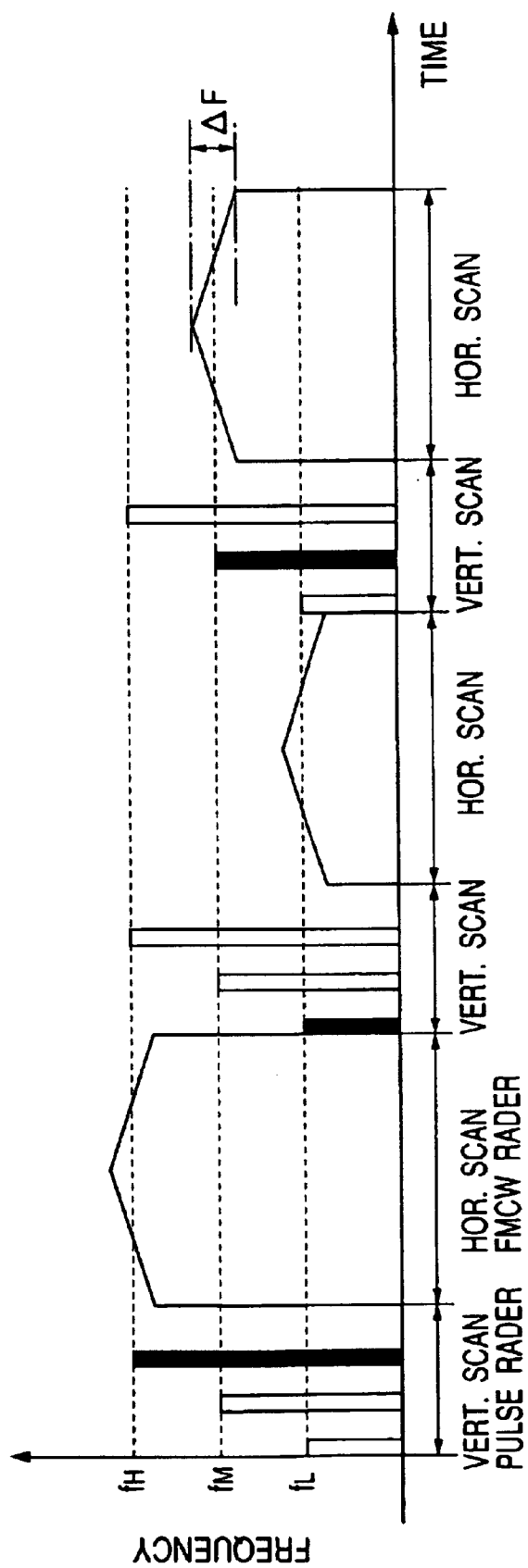
FIG. 5 is a time chart of the signal processing by the radar apparatus of Embodiment 1.

FIG. 5 is a time chart of the signal processing of the radar apparatus 2 of Embodiment 1. As shown in FIG. 5, the vertical and horizontal scan is alternately executed, thereby obtaining the vertical reflection distribution and obtaining the horizontal distribution at the vertical peak angle.

According to the radar apparatus 2 of Embodiment 1, the target is captured at the almost central portion along the vertical direction of the radar beam, even when the on-vehicle radar apparatus is inclined upward or downward due to the vehicle's heavy load, or even when the relative vertical position between the target and on-vehicle radar is shifted along the vertical direction during travelling on a slope. Thus, the radar beam is efficiently reflected by the target, thereby receiving a high S/N signal. Accordingly, the target to radar distance and target detection accuracy are stabilized.

Although the tilt angle θ was triple in the above explanation, it may be double, quadruple, or continuously changed.

Figure 6:
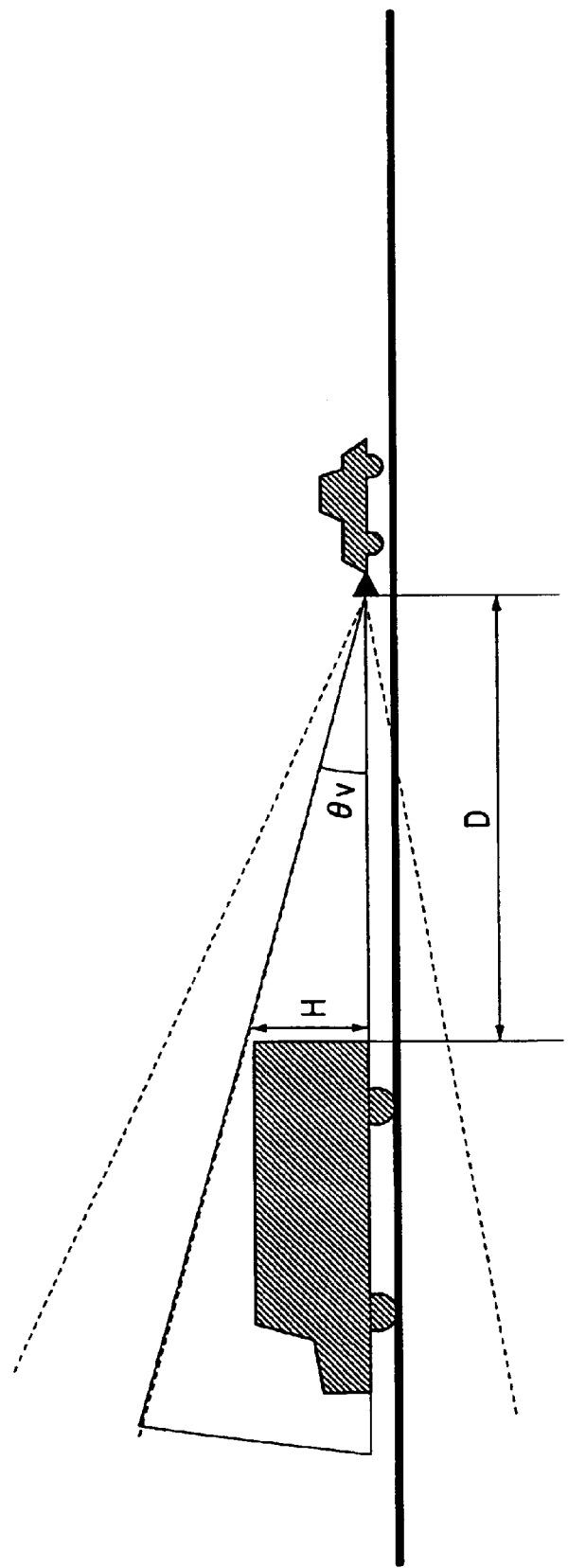
FIG. 6 is a conceptual side view for calculating the target height and on the basis of the tilt angle and target-to-radar distance.

Particularly, multiple or continuously changed tilt angle improves the angle resolution of the reflected intensity distribution. For example, an angular range $θ_V$ of the target is precisely obtained by the high resolution distribution, as shown in FIG. 6. Accordingly, the target height (vehicle height) "H" may be calculated on the basis of the $θ_V$, and target to radar distance "D".

Furthermore, the target width "W" may be calculated by a horizontal angular range $θ_H$ of the target and further the target area "S" may be calculated by d "W" and $θ_H$.

According to the size information "H", "W" and "S", an impact of crash between the target and the vehicle can be estimated, thereby controlling such a safety apparatus as an air-bag on the basis of the estimated crash impact.

Embodiment 2

The structure of the reception antenna 20, the operation of the SW control unit 30 and content of the processing of the signal processing unit 32 in Embodiment 2 are different from those in Embodiment. Therefore, the differences of Embodiment 2 from Embodiment 1 are mainly explained.

Figure 7A:
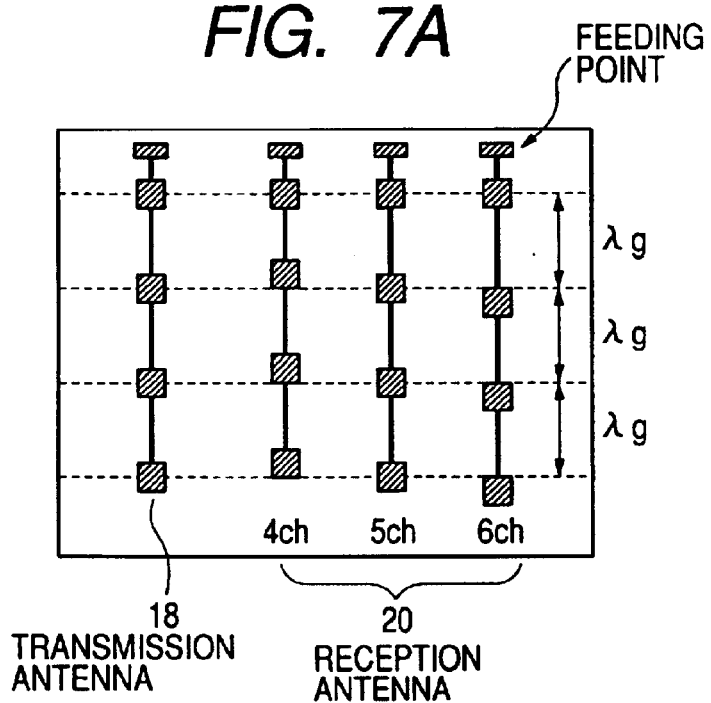
FIG. 7A is a conceptual planar view of the transmission antenna and reception antenna formed on a substrate for Embodiment 2.

Although the transmission antenna 18 and reception antenna 20 are the travelling wave excitation antennas (unit antennas constructed by antenna elements "E") formed on a substrate "P" in Embodiments 1 and 2, the distances between the antenna elements "E" are slightly different with each other, as shown in FIG. 7A. There are shown in FIG. 7A only 4 ch, 5 ch and 6 ch of the "n" unit antennas. Concretely, the inter-devices distances (distances between the antenna elements "E") are decided in such a manner that a tilt angle θ of an unit antenna in the reception antenna 20 is different with each other by □ θ expressed by formula (1).

$$Δθ = θ_w/(n-1) \tag{1}$$

, where "n" is a number of the unit antennas in the reception antenna 20, $θ_w$ is an angular range of the tilt angle θ to be controlled. Thus, the tilt angle θ is changed around zero degree by Δθ per unit antenna.

Figure 7B:
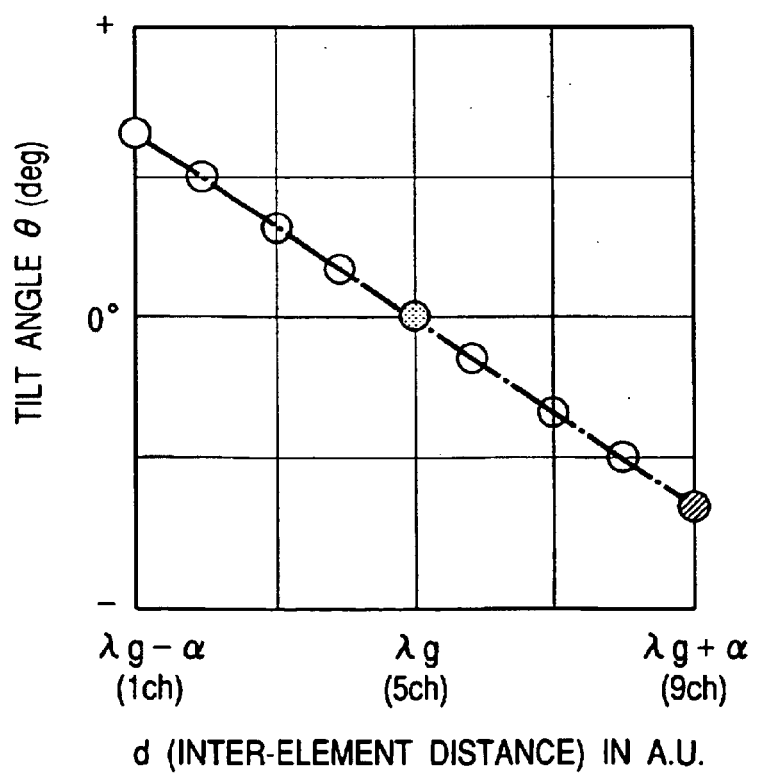
FIG. 7B is a graph of the oscillation wavelength of the travelling wave excitation antennas in the reception antenna as shown in FIG. 7B vs. radar beam radiation angle (tilt angle).

For example, If "n" is nine, the central unit antenna is designated to 5 ch of which tilt angle is zero degree, as shown in FIGS. 7B and 8. Therefore, the tilt angles are increased from 4 ch toward 1 ch, while they are decreased from 6 ch toward 9 ch.

Figure 9:
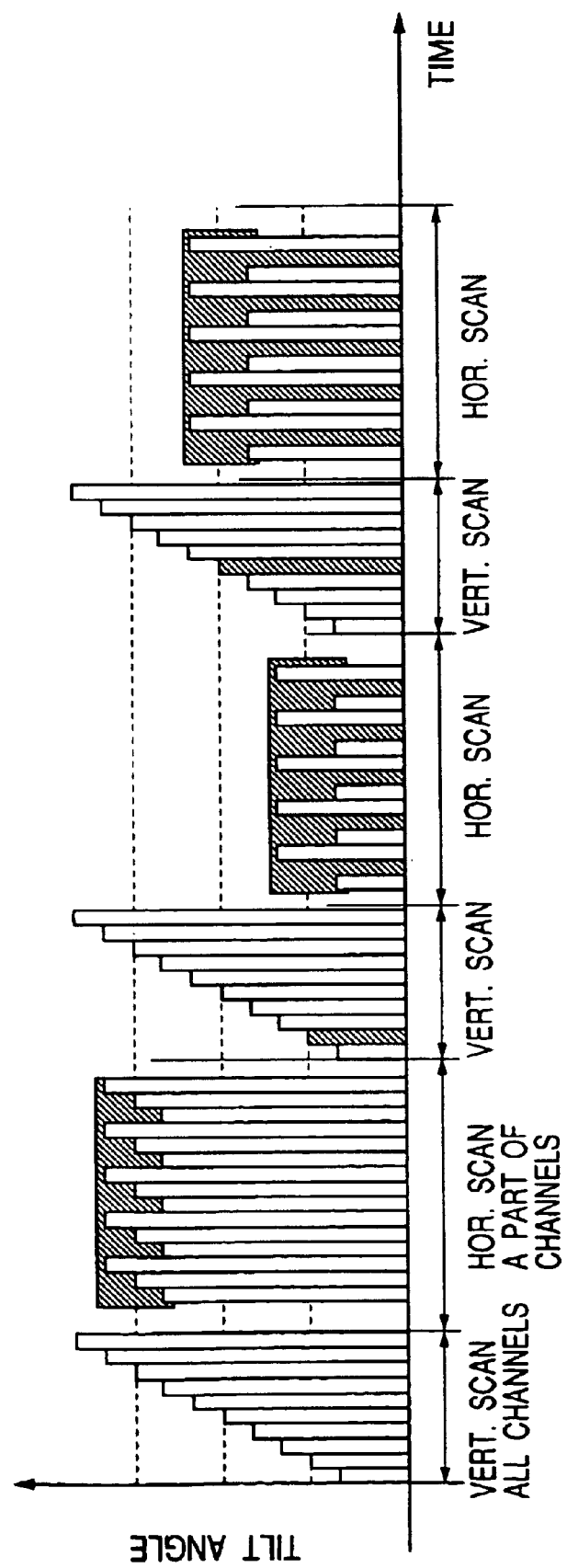
FIG. 9 is a time chart of the signal processing by the radar apparatus of Embodiment 2.

As shown in FIG. 9, the SW control unit 30 in Embodiment 2 sequentially selects by the reception switch 22 all the reception channels 1 ch to "n" ch, when the vertical scan mode is designated by the mode designated instruction Cx. Further, when the horizontal mode is designated, only prescribed "m" (m<n) channels are sequentially selected by the reception switch 22.

However, the horizontal direction of the target is detected with lowered accuracy, as the inter-devices distances (distances between the antenna elements) in the travelling wave excitation antenna (unit antenna) is increased. This is because the horizontal direction of the target is decided on the basis of the phase differences between the unit antennas (unit antennas). Accordingly, the number "m" of the prescribed channels should satisfy the following formula (2).

$$θ_X > (m-1) Δθ \tag{2}$$

, where $θ_X$ is angular range (of the tilt angle θ) within which the accuracy of detecting the horizontal direction of the target is tolerable.

The signal processing steps of the signal processing unit 32 in Embodiment 2 are different from only those of S110 and S130 in Embodiment 1.

At S110 modified for Embodiment 2, the vertical scan mode is turned on by the mode designation instruction Cx, thereby operating the VCO 14 at the frequency $f_F$ ($f_0$) in accordance with the modulation instructions C1 and C2. Thus, during sequentially selecting every channel ch 1 to ch "n", the sampling data of all the channels ch 1 to ch "n" is taken in through the A/D converter 128.

Further, at S130 modified for Embodiment 2, the prescribed "m" channels are sequentially selected by turning on the horizontal scan mode by the mode designation instruction Cx, in such a manner that the central channel is directed to the tilt angle at which the reflected intensity becomes maximum. At the same time, the VCO 14 generates in accordance with the modulation instructions C1 and C2 a frequency-modulated triangular wave at the central frequency $f_M$. Thus, the sampling data of "m" channels is taken in and stored through the A/D converter 28.

Therefore, Embodiment 2 differs from Embodiment 1 only in that an unit antenna (in other words, unit antennas or travelling wave excitation antennas) in the reception antenna 20 in Embodiment 2 has a tilt angle slightly different from other unit antennas and moreover in that, in Embodiment 2, only a prescribed number of the unit antennas (e.g., three as shown in FIG. 9) of which tilt angles are around the tilt angle at which the reflected intensity becomes maximum is selected.

Figure 10A:
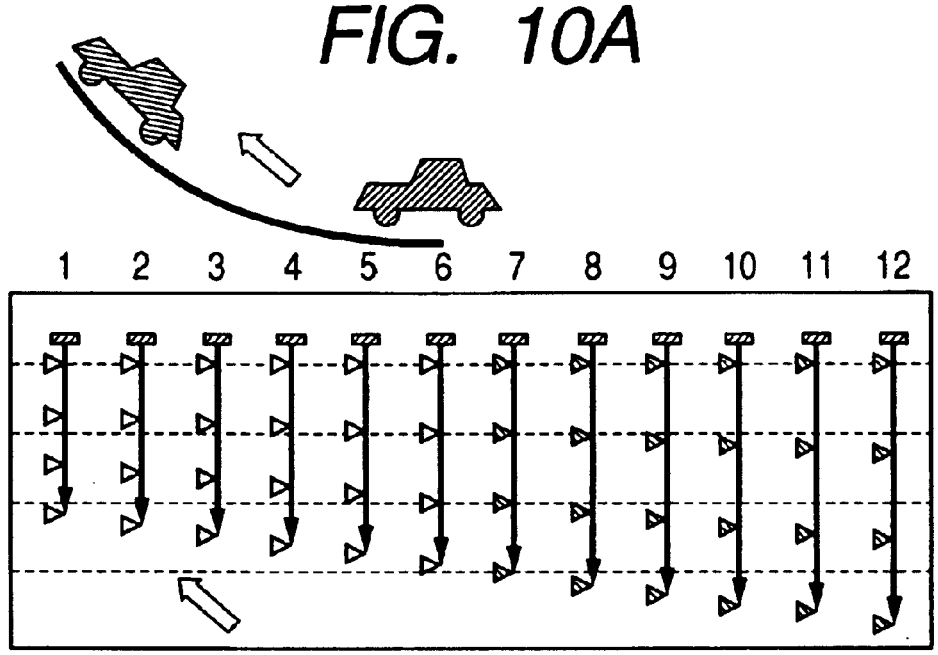
FIGS. 10A and 10B show exemplary channel selections in Embodiment 2, wherein the proceeding target vehicle is on a rising and down hill.
Figure 10B:
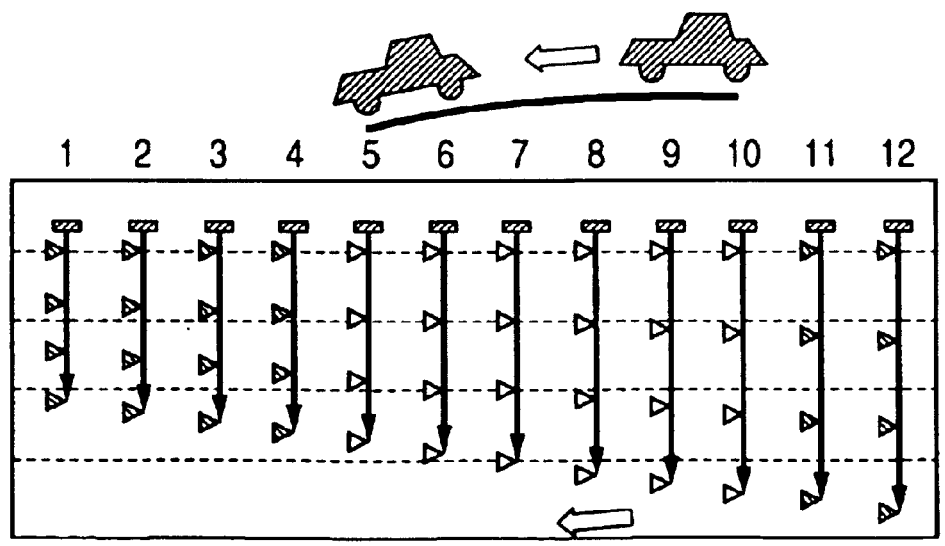

FIGS. 10A and 10B show an exemplary channel selection in Embodiment 2, wherein "n" is twelve and "m" is six. The upward beam channel ch 1 to ch 6 are selected during the horizontal scan, when the radar beam is reflected downward by the proceeding target vehicle on a rising hill, as shown in FIG. 10A. On the other hand, the downward beam channel ch 5 to ch 10 are selected during the horizontal scan, when the radar beam is reflected upward by the proceeding target vehicle on a down hill, as shown in FIG. 10B.

According to Embodiment 2, the tilt angle is not limited within a characteristics of the unit antenna (travelling wave excitation antenna), but it is changed in a wider range.

Although the tilt angle of the unit antenna was made different from each other by changing the inter-device distances, the surfaces of the unit antenna may be made inclined with each other.

Further, the central frequency may be shifted in accordance with the modulation instruction C2 in order to assure "m" channels, if the central channel decided at S120 is near the end position ch 1 or ch "n".

Embodiment 3

Embodiment 3 partially differs from Embodiment 2 in the inter-devices distance in the antenna elements "E", the vertical scan at S110 and horizontal scan at S130.

Figure 11:
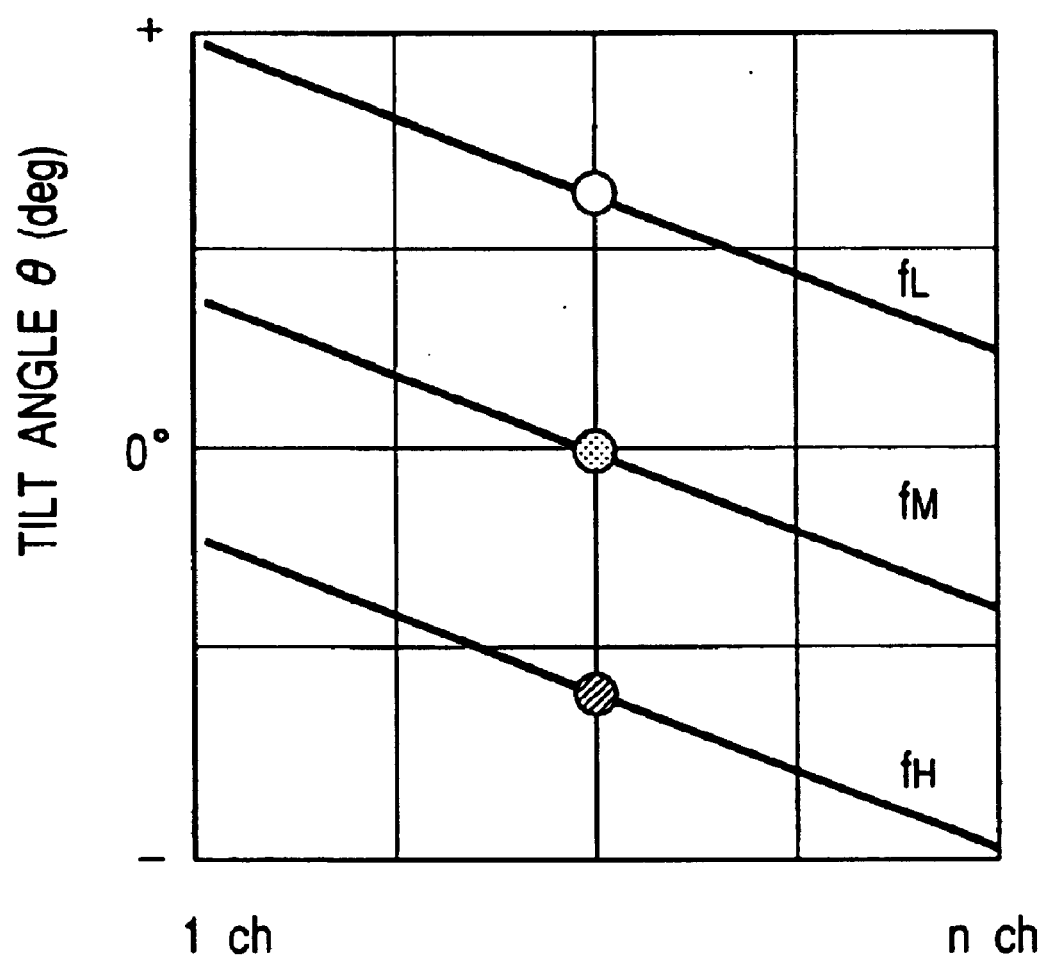
FIG. 11 is a graph of the tilt angle vs. channel of the travelling wave excitation antenna constructed by antenna elements, wherein the inter-element distance (IED) is decided, as shown in FIG. 11, in such a manner that: the tilt angle $\theta_A$ for the frequency $f_M$ of ch 1 with the narrowest IED is almost the same as $\theta_B$ for $f_L$ of ch "n" with the widest IED; and moreover, $\theta_C$ for $f_M$ of ch "n" with the widest IED is almost the same as $\theta_D$ for $f_H$ of ch 1 with the narrowest IED.

The inter-element distance (IED) is decided, as shown in FIG. 11, in such a manner that: the tilt angle $\theta_A$ for the frequency $f_M$ of ch 1 with the narrowest IED is almost the same as $\theta_B$ for $f_L$ of ch "n" with the widest IED; and moreover, $\theta_C$ for $f_M$ of ch "n" with the widest IED is almost the same as $\theta_D$ for $f_H$ of ch 1 with the narrowest IED.

At S110 modified for Embodiment 3, the vertical scan mode is turned on by the mode designation instruction Cx, thereby operating the VCO 14 at, e.g., $f_L$ (one of the three frequencies $f_L$, $f_M$, and $f_H$) in accordance with the modulation instructions C1 and C2. Thus, during sequentially selecting every channel 1 ch to "n" ch, the sampling data of all the channels (ch 1 to ch "n") is taken in through the A/D converter 128. Then, the VCO 14 is operated at, e.g., $f_M$, thereby obtaining the data of all channels. Further, the VCO 14 is operated at, e.g., $f_H$, thereby obtaining the data of all channels. Thus, the data of all channels at the three frequencies is obtained.

Further, at S130 modified for Embodiment 3, either one of the three frequencies $f_L$, $f_M$ or $f_H$ is decided, on the basis of the tilt angle at which the reflected intensity becomes maximum, and moreover, in such a manner that the channel corresponding to the above mentioned tilt angle is near the center of a series of unit antennas.

At the same time, the VCO 14 is operated at the above-decided frequency in accordance with the modulation instructions C1 and C2. Thus, the sampling data of "m" channels is taken in and stored through the A/D converter 28.

Therefore, Embodiment 3 differs from Embodiment 2 only in that the inter-device distances changed every channel and moreover in that the central frequency for the horizontal scan is decided on the basis of the tilt angle maximizing the reflection peak. According to Embodiment 3, similarly to Embodiment 2, the tilt angle can be changed in a wider range.

Although a part of the unit antennas was used for the horizontal scan, all the unit antenna may be used for the horizontal scan merely by choosing a central frequency, whereby the tilt angles of al the unit antennas are within the angular tolerance $\theta_X$.

Embodiment 4.

Embodiment 4 differs from Embodiment 1 only in that the tilt angle (beam radiation angle) is mechanically changed.

Figure 12A:
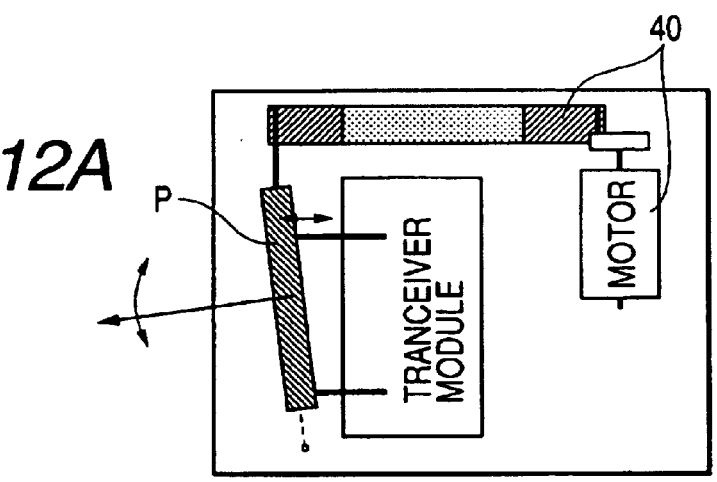
FIG. 12A is a conceptual planar view of the vertical tilt angle scan mechanism, wherein the antenna substrate "P" is pivotally supported at its back and is inclined by a driving mechanism 40 including a motor and link member, thereby changing the vertical radiation angle of the radar beam.

As shown in FIG. 12A, the antenna substrate "P" is pivotally supported at its back and is inclined by a driving mechanism 40 including a motor and link member, thereby changing the radiation angle of the radar beam.

Figure 13:
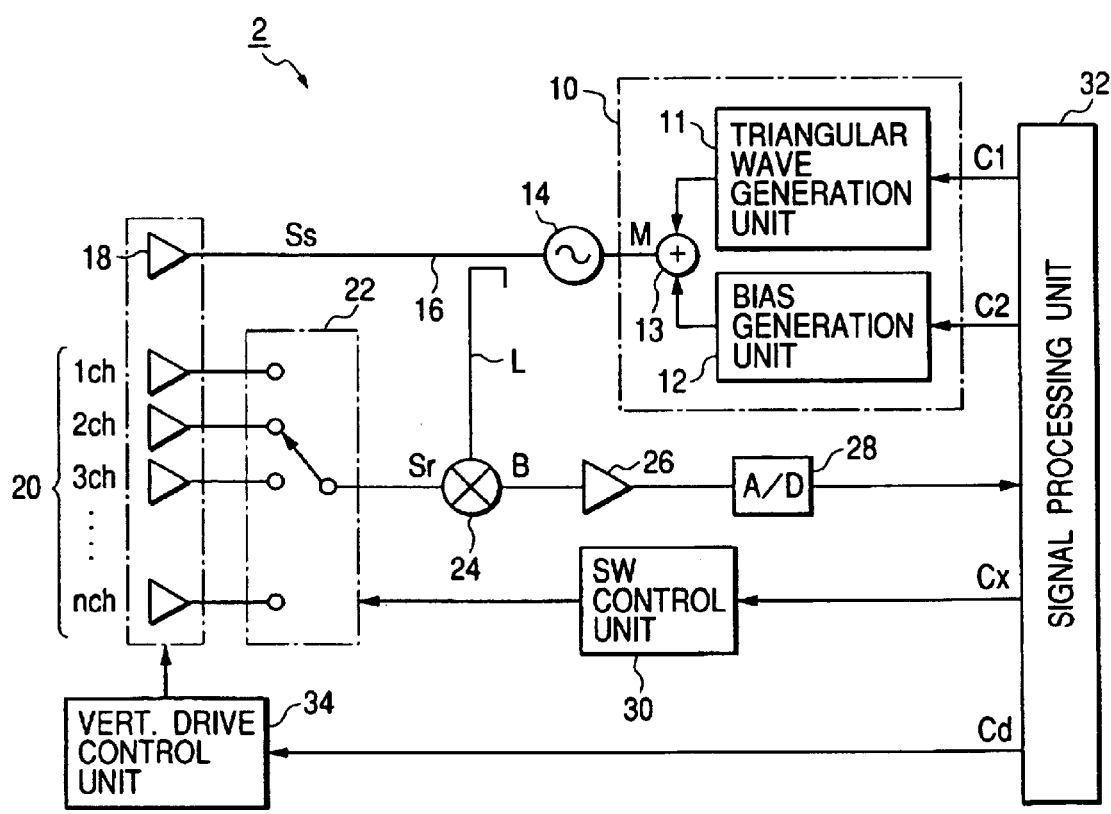
FIG. 13 is a block diagram of the radar apparatus of Embodiment 4 including the vertical driving control mechanism 34 for driving the vertical tilt angle scan mechanism as shown in FIGS. 12A, 12B and 12C.

The driving mechanism 40 as shown in FIG. 12A is controlled by a vertical scan control unit 34 as shown in FIG. 13 in accordance with a vertical scan instruction Cd from the signal processing unit 32.

Figure 12B:
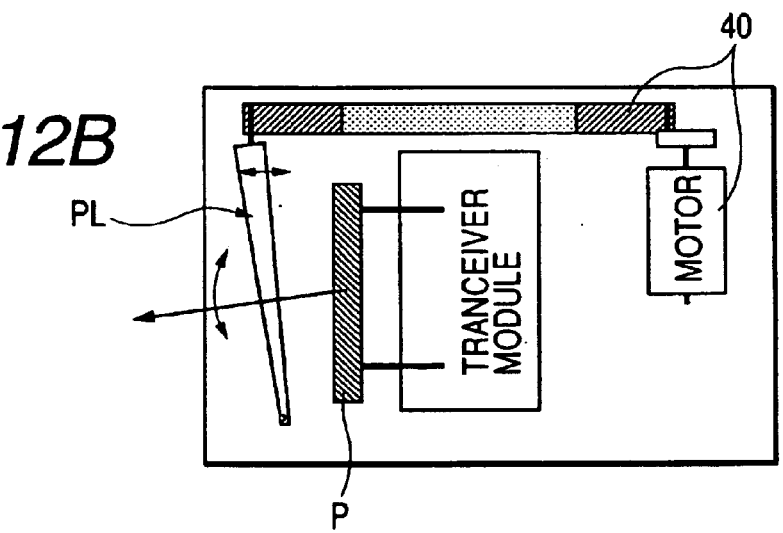
FIG. 12B is another conceptual planar view of the vertical tilt angle scan mechanism, wherein a dielectric prism or lens PL for refracting the radar beam is inclined by a driving mechanism 40 including a motor and link member, thereby changing the vertical radiation angle of the radar beam.

Alternatively, a dielectric prism or lens PL for refracting the radar beam may be inclined by the driving mechanism 40 as shown in FIG. 12B, controlled by the vertical scan control unit 34, as shown in FIG. 13.

Figure 12C:
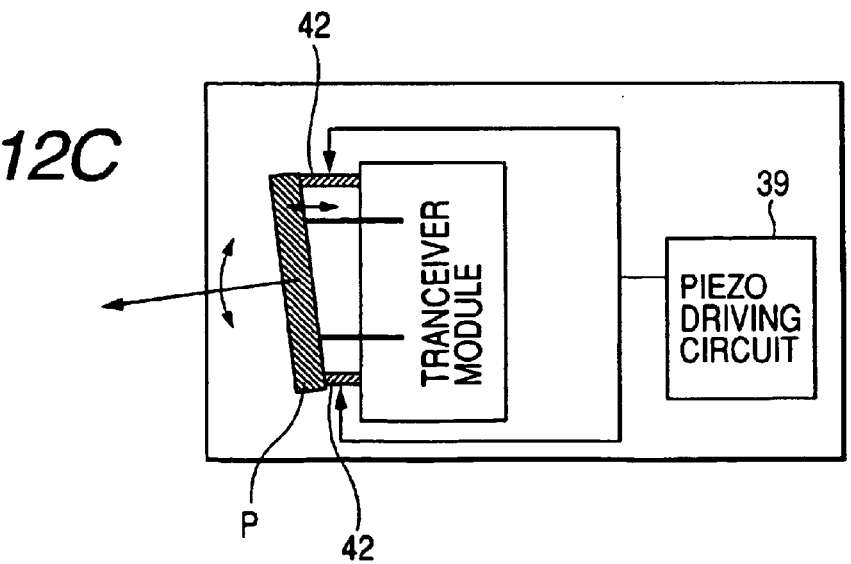
FIG. 12C is a still another conceptual view of the vertical tilt angle scan mechanism, wherein actuators 42 (for inclining the substrate "P") such as piezoelectric devices are fixed to the upper and lower end of the substrate "P" or fixed to above mentioned PL.

Further, as shown in FIG. 12C, actuators 42 (for inclining the substrate "P") such as piezoelectric devices are fixed to the upper and lower end of the substrate "P" or to above mentioned PL and are inclined by the piezo driving circuit 39 controlled by the vertical driving control unit 34, as shown in FIG. 13.

The process steps of the signal processing unit in Embodiment 4 differs from Embodiment 1 only in S120. At S120 modified for Embodiment 4, the tilt angle is detected by the vertical scan, similarly to Embodiment 1. If the detected tilt angle is near the upper or lower limit, the substrate "P" is inclined by the vertical scan instruction Cd, thereby shifting the tilt angle almost to the center of the above mentioned upper and lower limit.

According to Embodiment 4, the tilt angle can be arbitrarily shifted, thereby changing the tilt angle in a wider range, without limiting a frequency characteristics of the unit antenna.

Further, the mechanical vertical scanning in Embodiment 4 may be applied to Embodiments 2 and 3.

As explained above, Embodiment 4 is effective, when the unit antennas available for the horizontal scan are insufficient, due to the extreme tilt angle located at the upper or lower limit.

Embodiment 5

Figure 14:
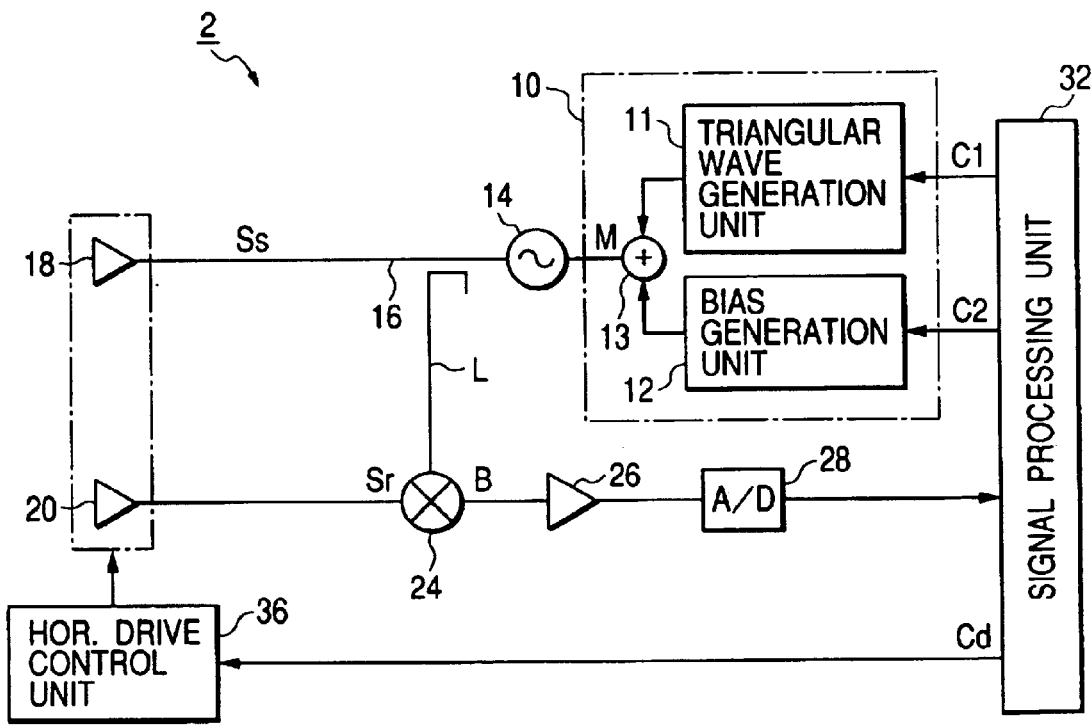
FIG. 14 is a block diagram of the radar apparatus of Embodiment 5, wherein the reception antena is a single travelling wave excitation antenna.

FIG. 14 is a block diagram of the FMCW radar apparatus of Embodiment 5 which differs from Embodiment 1 in that: the reception antenna 20 is a single travelling wave excitation antenna; and accordingly, the reception switch 22 is omitted.

Further, a horizontal driving control unit 36 is provided for driving a not-shown horizontal driving mechanism which mechanically inclines the radar beam along the horizontal direction.

According to Embodiment 5, the advantage of Embodiment 1 is not only assured, but also the horizontal scan can be executed in an angular range wider than Embodiment 1.

Other Embodiment

Although the reception antenna 20 as explained above included a plurality of unit antennas was employed in the above explained Embodiments, the transmission and/or reception antenna may include a plurality of unit antennas e.g., travelling wave excitation antennas. Further, the transmission and/or reception antenna may be a single antenna e.g., a single travelling wave excitation antenna. Further, the antenna may be commonly used for the transmission and reception.

Further, although the tilt angle (beam radiation angle) was defined along the vertical direction in the above explanation, it may be inclined from the vertical direction. The horizontal direction ia inclined together with the above mentioned inclined vertical direction.

Further, although only the reflection distribution was obtained during the vertical scan in the above explanation, the target to radar distance may be obtained during the vertical scan. If a plurality of targets are detected during the vertical scan, the tilt angle may be set up for the most distant target, thereby surely capturing the most nearest target as well as the most distant target.

Further, the relative speed between the target and radar may be obtained during the vertical scan. The tilt angle may be set up for only a moving target by removing standing objects among the detected targets, thereby preventing the radar apparatus from setting up a tilt angle for an unnecessary object and from reducing an accuracy of detecting a necessary target.

Further, the reception antenna is not only employed in the radar apparatus, but also may be employed in a mobile communication system, because the communication is kept stable due to the changeable tilt angle corresponding to a change of relative position between the automobiles.

What is claimed is:

1. A radar beam scanning method for scanning a radar beam for tracing a moving target, comprising the steps of:
    radiating a radar beam scanned along a second direction;
    measuring an intensity distribution along said second direction of said radar beam reflected by said moving target;
    estimating an angle along said second direction of said moving target;
    setting up said radar beam to the estimated angle;
    scanning along a first direction perpendicular to said second direction.

2. An on-vehicle radar apparatus for scanning a radar beam for tracing a moving target, comprising:
    intensity distribution acquiring means for acquiring an intensity distribution along a second direction of said radar beam reflected by said moving target;
    tilt angle setting-up means for setting up a tilt angle of said moving target on the basis of said intensity distribution; and
    radar operating means for scanning along a first direction perpendicular to said second direction and for at least detecting distances between one or more moving target and said on-vehicle radar apparatus.

3. The on-vehicle radar apparatus according to claim 2, which further comprises a second antenna for scanning along a second direction including a travelling wave excitation antenna for transmitting said radar beam toward said moving target,
    wherein said tilt angle setting-up means changes frequency of said radar beam.

4. The on-vehicle radar apparatus according to claim 2, which further comprises a first antenna for scanning along a first direction including a plurality of travelling wave excitation antennas each of which tilt angle along said second direction is different with each other for receiving said radar beam reflected by said moving target,
    wherein said tilt angle setting up means selects one or more travelling wave excitation antennas of which tilt angle are within a prescribed range around said tilt angle of said moving target.

5. The on-vehicle radar apparatus according to claim 4, wherein said travelling wave excitation antennas are constructed by a plurality of antenna elements along said second direction,
    wherein each of said tilt angles of said travelling wave excitation antennas is decided by changing distances between said antenna elements per travelling wave excitation antenna.

6. The on-vehicle radar apparatus according to claim 4, which further comprises target angle shifting means for shifting along said second direction said tilt angles of said travelling wave excitation antennas.

7. The on-vehicle radar apparatus according to claim 4, wherein said intensity distribution acquiring means acquires said intensity distribution by using a first antenna.

8. The on-vehicle radar apparatus according to claim 2, wherein said tilt angle setting up means sets up a target angle for a most distant moving target on the basis of said distances detected by said radar operating means.

9. The on-vehicle radar apparatus according to claim 2, which further comprises relative speed detecting means for detecting relative speeds between said on-vehicle radar apparatus and moving & not-moving targets,
    wherein said tilt angle set-up means sets up a tilt angle only for one of said moving target.

10. The on-vehicle radar apparatus according to claim 2, wherein said first direction is the horizontal direction and said second direction is the vertical direction.

11. The on-vehicle radar apparatus according to claim 2, which further comprises:
    angle range calculating means for calculating an angle range along said second direction perpendicular to a first direction within which said moving target exists; and
    size estimating means for estimating a size of said moving target by using said angle range calculating means and radar operating means.

12. The on-vehicle radar apparatus according to claim 11, wherein said size estimating means estimates a height of said moving target by using said angle range calculating means and radar operating means.

13. The on-vehicle radar apparatus according to claim 11, wherein:
    said radar operating means calculates a distance between said moving target and on-vehicle radar apparatus and an angle range along said first direction; and
    said size estimating means estimates a projected area of said moving target on the basis of said distance, angle range along said first and second directions.

14. The on-vehicle radar apparatus according to claim 2, wherein said radar operating means scans along a first direction perpendicular to said second direction said radar beam of frequency-modulated continuous wave and generates information about said moving target.

15. A computer program for scanning a radar beam for tracing a moving target, comprising the subroutines of:
    radiating a radar beam scanned along a second direction;
    measuring an intensity distribution along said second direction of said radar beam reflected by said moving target;
    estimating an angle along said second direction of said moving target;
    setting up said radar beam to the estimated angle;
    scanning along a first direction perpendicular to said second direction.

* * * * *